(No Model.)
W. H. EVANS.
VERTICAL SHAFT BEARING.
No. 377,148. Patented Jan. 31, 1888.
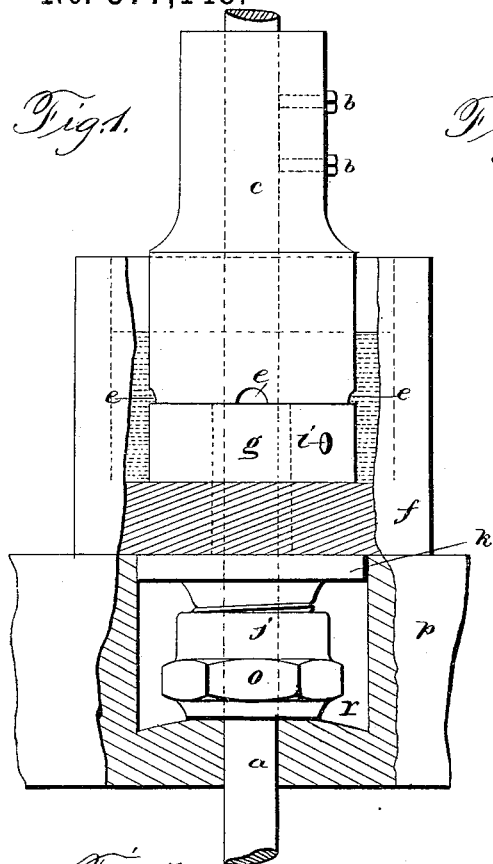
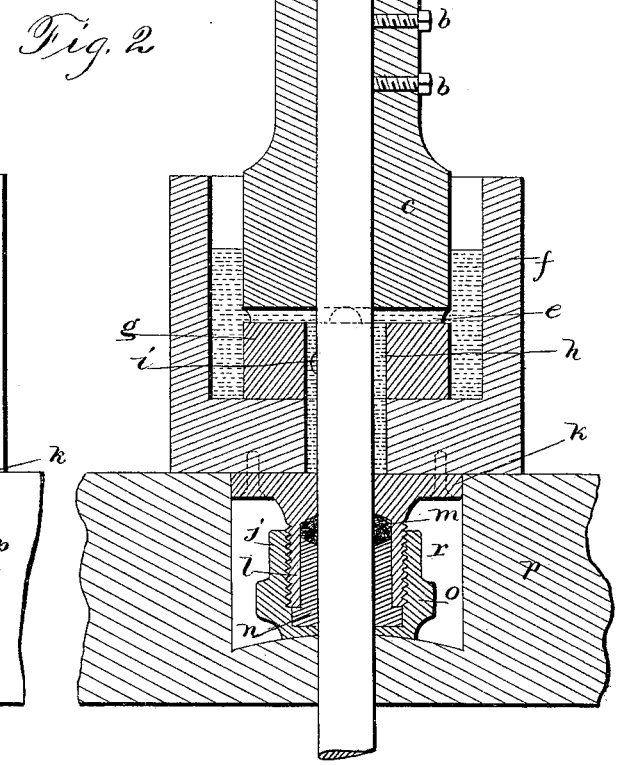
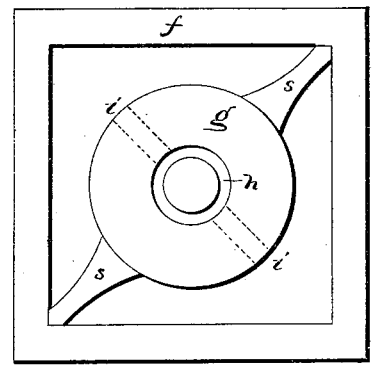
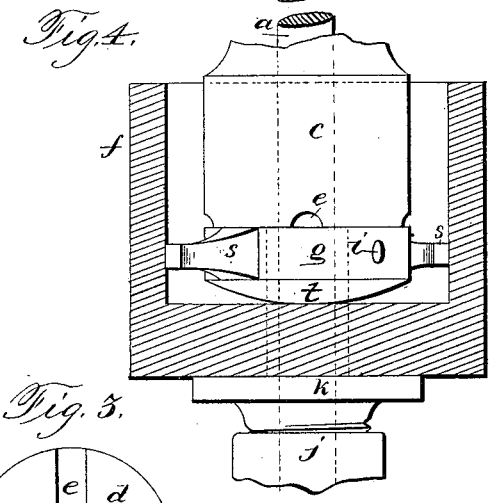
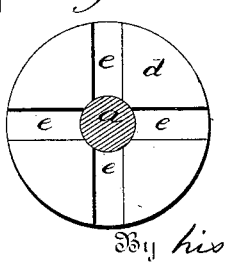
Witnesses
F. L. Ourand.
Daniel Scott
Inventor
William H. Evans
By his Attorney

United States Patent Office.

WILLIAM H. EVANS, OF BALTIMORE, MARYLAND.

VERTICAL-SHAFT BEARING.

SPECIFICATION forming part of Letters Patent No. 377,148, dated January 31, 1888.

Application filed June 11, 1887. Serial No. 241,051. (No model.)

*To all whom it may concern:*

Be it known that I, WILLIAM H. EVANS, a citizen of the United States, residing at the city of Baltimore, in the State of Maryland, have invented a certain new and useful Improvement in Vertical-Shaft Bearings, of which the following is a full, clear, and exact description.

Ordinarily vertical shafts have their bearings in steps at their lower ends, the said shafts being supported at their upper ends in suitable bushes, but the steps take the weight and wear of the shaft. Sometimes, also, such vertical shafts have been suspended from above and the foot-step dispensed with.

My invention relates to the latter class of vertical shafts.

The invention consists in a bearing for suspending a shaft, so as to obviate the necessity of the foot-step and at the same time keeping the parts well lubricated, the construction and operation being substantially as hereinafter more particularly set forth and claimed.

In the accompanying drawings, in the several figures of which like parts are similarly designated, Figure 1 is a side elevation with the oil-cup and supporting-beam partly broken away. Fig. 2 is a vertical section in the line of the oil-ducts. Fig. 3 is a bottom view of the sleeve, showing the shaft in section. Fig. 4 is a side elevation of another form of bearing, the oil-cup being in section; and Fig. 5 is a plan of the same.

As my invention is of general utility, I have not shown it as applied to any particular machine, and will describe it, therefore, accordingly.

$a$ is a shaft. Near its upper end this shaft has attached to it, by screws $b$ or other means, a sleeve or collar, $c$, the lower face, $d$, of which is dressed or made smooth and provided with radial ducts $e$.

$f$ is an oil-cup or box, in the bottom of which is arranged a step or bearing, $g$, having the central opening, $h$, of somewhat greater diameter than the diameter of the shaft $a$. This bearing or step is pierced transversely to form ducts $i$, which communicate with the oil cup or box and with the opening $h$, so as to permit the oil in the cup or box to flow into the opening $h$, and thus come in contact with the shaft when the shaft is in position, and also prevent overheating, it being assumed, as understood, that the shaft has a rotary motion upon the bearing or step $g$. The opening $h$ is provided with any suitable stuffing-box, $j$, which in this instance is shown as composed of a plate, $k$, attached to the bottom of the oil cup or box, said plate having a projecting screw-threaded nipple, $l$, which receives packing $m$, and gland $n$, to hold the packing in place, and a screw-cap, $o$, to secure the gland in position. The opening in the plate $k$ and the opening in the gland $n$ are of substantially the diameter of the shaft to effect an oil-tight fit about the shaft and thus close the opening $h$.

The shaft-bearing thus constructed may be supported on any suitable portion, $p$, of the frame of a machine, or said portion $p$ may be a beam or hanger specially provided for the bearing. Preferably the portion $p$ will be made with a recess, $r$, to receive the stuffing-box $j$.

The rotation of the shaft serves to suck the oil from the box through the ducts $i$ into the opening $h$, and the ducts $e$ afford an escape for such indrawn oil back into the box again by centrifugal action. A sort of forced circulation of the oil is thus kept up, and thorough lubrication of the bearing and shaft is thus effected.

The shaft may be provided with bushes at either or both ends to steady it, when this is desirable; and to this end any of the well-known bushes may be employed. The driving mechanism for this shaft may be arranged above or below the bearing. The area of the contact-surface between the collar $c$ and the bearing $g$ is large, in order to afford an extended bearing-surface to properly support the shaft, the proportions being substantially as indicated in the drawings.

The bearing $g$ may be formed with or attached to the oil-cup in any suitable manner; and if the said bearing be not integral with the oil-cup it will be provided with any suitable detaining devices for preventing its rotation with the shaft. Such devices are shown in Figs. 4 and 5 as arms $s$, projecting radially from the said bearing, so as to engage diagonally-opposite corners of the oil-cup, if said oil-cup be rectangular; and, of course, if the oil-cup be other than rectangular other obvious detaining devices $s$ will be provided.

When the bearing $g$ is made independent of the oil-cup, its bottom surface may be convex or rounded, and by this means the said bearing will be self-adjusting with respect to the collar or sleeve on the shaft. Such convex or curved bottom bearing is shown in Fig. 4 and designated $t$, the bearing being designated $g$, as in the other figures of the drawings. The bottom $t$ will rest upon the bottom of the oil cup or box, which may be a plane surface, or one complementary to the bottom $t$, and the bearing be thus supported in the oil-cup and have a freedom of motion within the limits of the detaining devices $s$.

What I claim is—

1. A bearing for suspending vertical shafts, comprising a collar or sleeve made fast to the shaft, the oil cup or box having a bearing to receive said collar or sleeve, and a stuffing-box surrounding the shaft and closing the lower end of the oil cup or box, substantially as described.

2. A vertical shaft, a collar or sleeve secured thereto and provided with a dressed face having ducts therein, combined with an oil cup or box having a bearing provided with a shaft-opening of greater diameter than the shaft and pierced transversely with oil-ducts, substantially as described.

3. A vertical shaft, a collar or sleeve secured thereto and provided with a dressed face having ducts therein, combined with an oil cup or box having a bearing provided with a shaft-opening of greater diameter than the shaft, and pierced transversely with oil-ducts, and a stuffing-box fitted oil-tight to the shaft beneath the shaft-opening in the oil box or cup, substantially as described.

4. The oil box or cup, a bearing therein having a shaft-opening of greater diameter than the shaft, and pierced transversely to form ducts communicating with said opening and the surrounding box, combined with a shaft extending vertically through the said box and its bearing, and the collar or sleeve secured to said shaft and seated upon the said bearing, substantially as described.

5. A bearing for suspending vertical shafts, comprising a collar or sleeve made fast to the shaft, an oil cup or box, and a loose bearing arranged in said box to receive the said collar or sleeve, and constructed with a convex or curved supporting surface, substantially as described.

6. A bearing for suspending vertical shafts, comprising a collar or sleeve made fast to the shaft, an oil cup or box, and a loose bearing arranged in said box to receive the said collar or sleeve, and constructed with a convex or curved supporting-surface combined with a stuffing-box, substantially as described.

7. A bearing for suspending vertical shafts, comprising a collar or sleeve made fast to the shaft, an oil cup or box, and a loose bearing arranged in said box to receive the said collar or sleeve, and constructed with a convex or curved supporting-surface combined with detaining devices $s$, engaging the oil cup or box, for preventing the bearing from rotating with the shaft, substantially as described.

In testimony whereof I have hereunto set my hand this 10th day of June, A. D. 1887.

WILLIAM H. EVANS.

Witnesses:
PH. H. HOFFMAN,
HENRY B. HEMMETER.